United States Patent
Karmon et al.

(10) Patent No.: US 9,898,256 B2
(45) Date of Patent: Feb. 20, 2018

(54) TRANSLATION OF GESTURE TO GESTURE CODE DESCRIPTION USING DEPTH CAMERA

(71) Applicant: Microsoft Technology Licensing, LLC, Redmond, WA (US)

(72) Inventors: Kfir Karmon, Petach-Tikva (IL); Adi Diamant, Shoham (IL); Eyal Krupka, Shimshit (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 24 days.

(21) Appl. No.: 14/985,804

(22) Filed: Dec. 31, 2015

(65) Prior Publication Data

US 2017/0192753 A1  Jul. 6, 2017

(51) Int. Cl.
G06F 3/01 (2006.01)
G06K 9/00 (2006.01)
G06F 9/44 (2018.01)
G06F 3/03 (2006.01)

(52) U.S. Cl.
CPC ............ *G06F 8/30* (2013.01); *G06F 3/017* (2013.01); *G06F 3/0304* (2013.01); *G06K 9/00355* (2013.01)

(58) Field of Classification Search
CPC .... G06F 3/04842; G06F 3/04883; G06F 8/38; G06F 8/30; G06F 3/017; G06F 3/0304; G06F 3/0418; G06F 3/0488; G11B 27/329; G06K 9/00455; G06K 9/00355
See application file for complete search history.

(56) References Cited

U.S. PATENT DOCUMENTS

| | | | | |
|---|---|---|---|---|
| 8,013,890 B2* | 9/2011 | Ohtake | ............. | G06K 9/00234 348/170 |
| 8,631,317 B2* | 1/2014 | Kangas | ............... | G06F 3/04883 715/227 |
| 9,207,771 B2* | 12/2015 | Antoniac | ........... | G06K 9/00389 |
| 9,430,140 B2* | 8/2016 | Reuschel | ............ | G06F 3/04883 |
| 9,454,225 B2* | 9/2016 | Bychkov | ................ | G06F 3/013 |

(Continued)

FOREIGN PATENT DOCUMENTS

WO   WO 2014/113454   7/2014

OTHER PUBLICATIONS

Lu et al., Gesture coder: a tool for programming multi-touch gestures by demonstration, May 2012, 10 pages.*

(Continued)

*Primary Examiner* — Thuy Dao

(57) ABSTRACT

A system of injecting a code section to a code edited by a graphical user interface (GUI) of an integrated development environment (IDE), comprising: a memory storing a dataset associating each code segment with one hand pose feature or hand motion feature; an imager adapted to capture images of a hand while an IDE being executed on a client terminal; and processor for executing code of an application, comprising: code instructions to identify at least one of the features and at least one discrete value of the identified features from an analysis of the images; code instructions to select at least one of the code segments associated with the identified features; and code instructions to add automatically a code section generated based on the code segments and the discrete value to a code presented by a code editor of the IDE.

20 Claims, 12 Drawing Sheets

(56) References Cited

U.S. PATENT DOCUMENTS

| | | | | |
|---|---|---|---|---|
| 9,468,848 | B2* | 10/2016 | Murillo | G06F 3/017 |
| 9,767,616 | B2* | 9/2017 | Miller | G06T 19/006 |
| 2010/0050133 | A1* | 2/2010 | Nishihara | G06F 3/0425 |
| | | | | 715/863 |
| 2012/0092286 | A1* | 4/2012 | O'Prey | G06F 3/0416 |
| | | | | 345/174 |
| 2013/0336524 | A1* | 12/2013 | Zhang | G06K 9/00355 |
| | | | | 382/103 |
| 2014/0129935 | A1 | 5/2014 | Nahon | |
| 2014/0130090 | A1* | 5/2014 | Krikorian | H04N 5/4403 |
| | | | | 725/37 |
| 2014/0173563 | A1* | 6/2014 | Dias | G06F 8/74 |
| | | | | 717/123 |
| 2014/0229858 | A1* | 8/2014 | Bleker | H04W 4/206 |
| | | | | 715/753 |
| 2015/0007130 | A1* | 1/2015 | McConville | G06F 3/017 |
| | | | | 717/106 |
| 2015/0029092 | A1 | 1/2015 | Holz et al. | |
| 2015/0309579 | A1* | 10/2015 | Wang | G06F 3/017 |
| | | | | 345/156 |
| 2016/0096072 | A1* | 4/2016 | Rahman | G06F 3/011 |
| | | | | 482/8 |
| 2016/0109954 | A1* | 4/2016 | Harris | G06F 3/017 |
| | | | | 345/156 |

OTHER PUBLICATIONS

International Search Report and the Written Opinion dated 6 Apr. 2017 From the International Searching Authority Re. Application No. PCT/US2016/067897. (12 Pages).

\* cited by examiner

```
        var notPintch = new SingleHandPose("NotPinch");
        notPintch.FingersPoses.Add(new[] { Finger.Index,
Finger.Thumb }, FingerFlexion.Opened,
PoseDirection.Forward);
        notPintch.FingersTangencyRelations.Add(new[] {
Finger.Index, Finger.Thumb }, FingersTangency.NotTouching);

var pinch = new SingleHandPose("Pinch");
        notPintch.FingersPoses.Add(new[] { Finger.Index,
Finger.Thumb }, FingerFlexion.Opened,
PoseDirection.Forward);
        notPintch.FingersTangencyRelations.Add(new[] {
Finger.Index, Finger.Thumb }, FingersTangency.FingerTip);

var retract = new SingleHandMotion("Retract", new
PalmMotion(new AnyHandContext(),
MotionDirection.Backward));

var slingShot = new Gesture("Slingshot");
        slingShot.AddSegment(notPintch);
        slingShot.AddSegment(pinch);
        slingShot.AddSegment(retract);
        slingShot.AddSegment(notPintch);
```

Fig. 10

```xml
<Gesture xmlns="http://schemas.microsoft.com/moriah/2015/xaml"
Name="Gesture">
  <Gesture.Segments>
    <IdleGestureSegment Name="Idle" />

<SingleHandPose Name="Point">
      <SingleHandPose.FingersPoses>
        <FingersPose Context="Index" Direction="Forward" Flexion="Opened" />
        <FingersPose Context="Thumb, Middle, Ring, Pinky" Flexion="Folded" />
      </SingleHandPose.FingersPoses><SingleHandPose.PalmPose><PalmPose Context="{AnyHand}" /></SingleHandPose.PalmPose>
    </SingleHandPose>

<SingleHandMotion Name="CheckMark">
      <SingleHandMotion.FingersMotions>
        <FingersMotion Context="Index" MotionScript="DiagonalRightDownward,DiagonalRightUpward,DiagonalRightUpward" />
      </SingleHandMotion.FingersMotions><SingleHandMotion.PalmMotion><PalmMotion Context="{AnyHand}" MotionScript="Undefined" /></SingleHandMotion.PalmMotion>
    </SingleHandMotion>
  </Gesture.Segments>

<Gesture.SegmentsConnections>
    <SegmentConnections From="Idle" To="Idle, Point" />
    <SegmentConnections From="Point" To="CheckMark" />
    <SegmentConnections From="CheckMark" To="Idle" />
  </Gesture.SegmentsConnections>
</Gesture>
```

Fig. 12

TRANSLATION OF GESTURE TO GESTURE CODE DESCRIPTION USING DEPTH CAMERA

RELATED APPLICATIONS

This application is related to co-filed, co-pending and co-assigned U.S. Patent Applications entitled "HAND GESTURE API USING FINITE STATE MACHINE AND GESTURE LANGUAGE DISCRETE VALUES" (U.S. patent application Ser. No. 14/985,691, filed on Dec. 31, 2015), "MULTIMODAL INTERACTION USING A STATE MACHINE AND HAND GESTURES DISCRETE VALUES" (U.S. patent application Ser. No. 14/985,716, filed on Dec. 31, 2015), "RECOGNITION OF HAND POSES BY CLASSIFICATION USING DISCRETE VALUES" (U.S. patent application Ser. No. 14/985,741, filed on Dec. 31, 2015, now U.S. Pat. No. 9,734,435), "TRANSFORM LIGHTWEIGHT SKELETON AND USING INVERSE KINEMATICS TO PRODUCE ARTICULATE SKELETON" (U.S. patent application Ser. No. 14/985,777, filed on Dec. 31, 2015), "STRUCTURE AND TRAINING FOR IMAGE CLASSIFICATION" (U.S. patent application Ser. No. 14/985,803, filed on Dec. 31, 2015), "GESTURES VISUAL BUILDER TOOL" (U.S. patent application Ser. No. 14/985,775, filed on Dec. 31, 2015), "ELECTRICAL DEVICE FOR HAND GESTURES DETECTION" (U.S. patent application Ser. No. 14/985,728, filed on Dec. 31, 2015) and "DETECTION OF HAND GESTURES USING GESTURE LANGUAGE DISCRETE VALUES" (U.S. patent application Ser. No. 14/985,680, filed on Dec. 31, 2015), the disclosures of which are incorporated herein by reference.

BACKGROUND

The major technological advances of our times in computerized environment have dramatically increased human machine interaction. Traditional human-machine interfaces (HMI) which usually employ input/output devices, such as keyboards, pointing devices and/or touch interfaces may have served the needs of previous times but as HMI becomes highly intense more natural interfaces are desirable. Such natural interfaces may employ one or more different techniques to provide a simple, straight forward, friendly interface to the user while avoiding the use of mediator hardware elements. Furthermore, two or more natural human-machine user interface (NUI) methods may be combined together to provide comprehensive solution allowing a user to simply and/or directly interact with a computerized device, for example, computer, mobile device, computerized machine and/or computerized appliance.

SUMMARY

According to some embodiments of the present disclosure, there are provided systems and methods for injecting a code section to a code edited by a graphical user interface (GUI) of an integrated development environment (IDE) based on hand gestures identified from an image sequence. Definition, creation, construction and/or generation of hand gestures, hand poses and/or hand motions as referred to hereinafter throughout this disclosure refers to definition, creation, construction and/or generation of representations of hand gestures, hand poses and hand motions respectively which simulate respective hand gestures, poses and motions of a hand(s).

The GUI includes an option for a programmer to activate an imager, such as a camera, to capture an image sequence of a hand gesture, for example performed by the programmer's hand. The hand gesture is identified from an analysis of the image sequence, taking advantage of a simple gesture language in which a finite number of discrete pose and motion values building block are used to define each hand pose and/or motion respectively. One or more code segments are selected from a memory storing a plurality of code segments associated with hand pose and motion building blocks, a code section is constructed from the code segments and the identified pose and motion values and automatically added to the edited code.

Each of the hand gestures is defined by a gesture dataset of discrete values describing the features (characteristics) of the hand gesture, for example, hand pose, hand and/or fingers spatial location, fingers relative location to one another, fingers tangency, hand and/or fingers motion outline and/or motion characteristics.

Optionally, the gesture dataset documents one or more hand poses and/or hand motions wherein each of the one or more hand poses and/or hand motions is defined by a features record of discrete values of the hand features. The gesture dataset optionally defines one or more sequences and/or finite state machines (FSM) documenting transitions between hand pose(s) and/or hand motion(s). The discrete nature of the gesture allows each hand pose and/or hand motion to be easily constructed by a representation of a finite number features. In addition the discrete values implementation may greatly reduce the sensitivity to gesture variance among a plurality of users since each of the hand gestures is brought down to a minimal representation. Furthermore, the minimal representation of the discrete implementation may simplify recognition, identification and/or classification of the hand gestures in runtime, avoiding the use of machine learning and intensive computer vision processing.

The code section relating to the hand gesture may be used by a gesture HMI to interact with a computerized machine, such as a computer, which integrates and/or is attached to an imaging device(s) and monitors a user's hand movement. The IDE may be coupled with a gesture library and/or a gesture application programming interface (API) to allow the programmer a straight forward distribution path for sharing and/or hooking the created one or more hand gestures to one or more functions of one or more applications to employ the gesture HMI.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings:

FIG. 10 is an exemplary code section for a slingshot hand gesture, according to some embodiments of the present disclosure;

FIG. 12 is an exemplary Extensible Application Markup Language (XAML) code section for the checkmark gesture of FIG. 11, according to some embodiments of the present disclosure.

DETAILED DESCRIPTION

Figure 1:
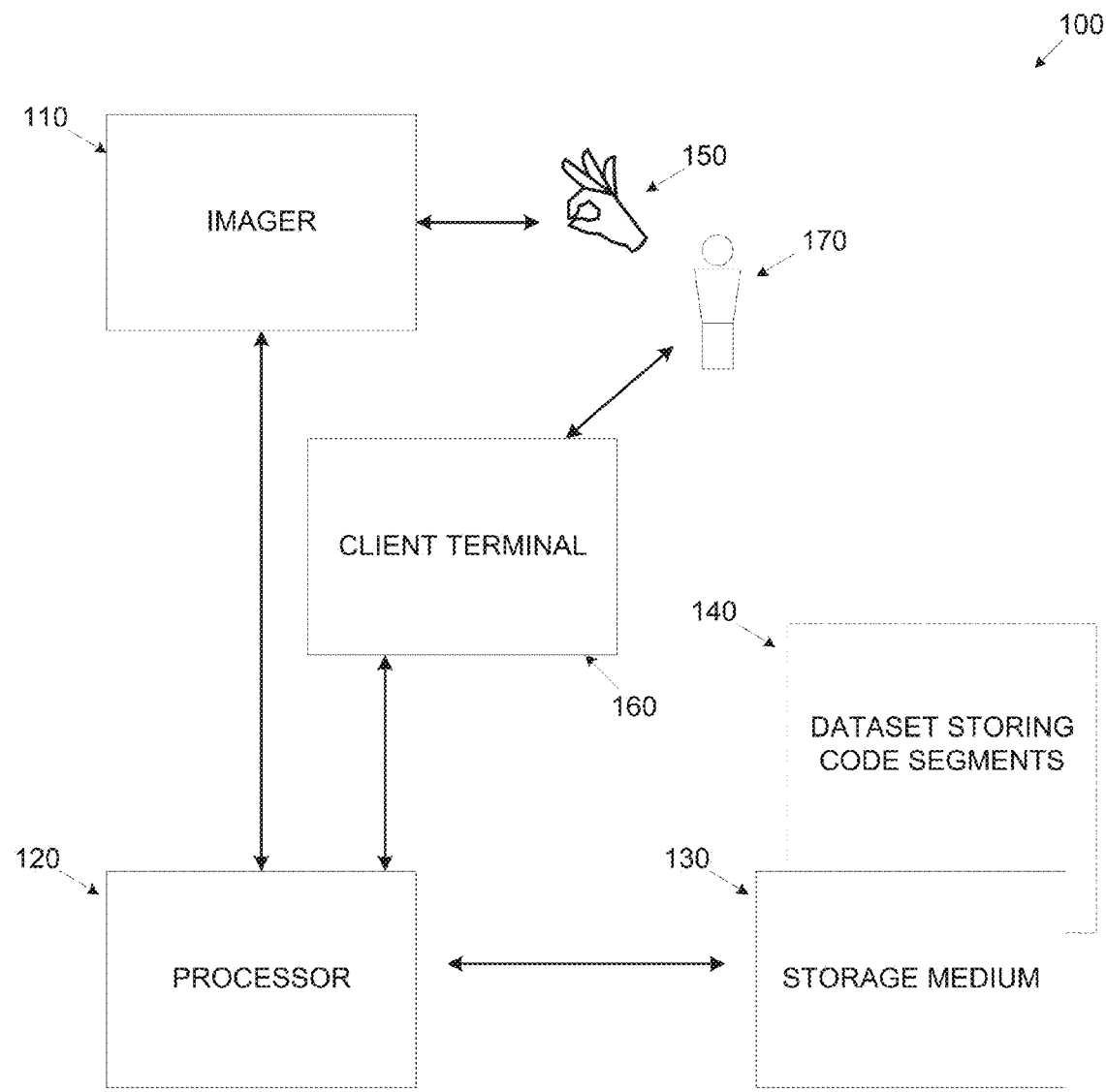
FIG. 1 is a schematic illustration of an exemplary system for injecting a code section to a code edited by a graphical user interface (GUI) of an integrated development environment (IDE), according to some embodiments of the present disclosure.

According to some embodiments of the present disclosure, there are provided systems and methods for injecting a code section to a code edited by a graphical user interface (GUI) of an integrated development environment (IDE) based on hand gestures identified from an image sequence. A programmer may easily create, by capturing a gesture with a camera, code to be used by a gesture HMI to interact with a computerized machine which integrates and/or is attached to an imaging device(s) which monitors a user's hand movement.

The IDE is executed on a client terminal, such as a computer, a laptop, a smartphone, a tablet and/or any other processor based machine or appliance which integrates and/or is attached to an imaging device(s). The IDE may be executed on one or more processors, for example, a local application(s), a web service accessible for example using a web browser, a remote service provided by remote one or more servers and/or a web robot (bot) connection. The IDE may include any software and/or hardware program allowing programmers to write, edit and/or test executable code, for example, Microsoft Visual Studio. The GUI may include an input device, for example, keyboard, touchscreen, a digital surface and/or pointing device such as, for example, a mouse and an output device, for example a monitor, a projector and/or a screen. A hand gesture may refer to one or more hand poses and/or hand motions performed by a single hand and/or of both hands (right and left). For brevity, reference hereinafter is made to hand gesture to address hand gestures of one and/or both hands.

A dataset defines a plurality of hand pose features and a plurality of hand motion features. For each hand pose feature and hand motion feature, a code segment is defined in the dataset. Each hand pose feature represents a specific feature (characteristic) of a hand(s) pose. The pose features may include for example, a hand selection (left, right, both and/or any), a hand rotation, a hand direction, a finger direction (per finger), a finger flex (per finger), a finger tangency (per two or more fingers) and/or a finger relative location (per two or more fingers). The motion features may include for example, motion properties such as, for example, size, speed, range and/or location in space and/or motion script(s) which define the motion shape. The motion script may be defined as a curve in the format of, for example, scalable vector graphics (SVG) and/or a string constructed of one or more predefined discrete micro-movements which define micro-movements in each of the three two-dimension (2D) planes.

Optionally, the dataset defines a plurality of hand pose features records, each defined by a unique set of discrete values of hand pose features, and a plurality of hand motion features records, each representing a specific feature of the hand(s) motion. For each hand pose features record and hand motion features record, a code segment is defined in the dataset. The hand pose features record may include, for example, a features vector, a features matrix and/or a features table. Optionally, each hand pose features record and hand motion features record is defined by one state of a finite state machines (FSM) which includes a finite number of states, each constructed by a set of discrete values. A unique logic sequence of one or more of the hand pose features records and/or hand motion features records may represent one or more hand gestures, for example by a unique finite state machine (FSM) documenting transitions between hand pose(s) and/or hand motion(s).

The GUI of the IDE includes an option for a programmer, such as a button, to activate an imager located in proximity to the client terminal. The imager, such as a camera, captures a plurality of images of a hand, for example the programmer's hand performing a gesture, and sends the image to a processor for analysis. The image analysis may include, for example, discriminative fern ensemble (DFE) and/or discriminative tree ensemble (DTE) for identifying the group of discrete pose values and motion values representing the hand gesture. At least one hand pose feature and/or hand motion feature and its value is identified based on the group of discrete pose values and/or motion values. At least one code segment associated with at least one of the hand pose feature(s) and/or hand motion feature(s) is selected from the dataset. Optionally, at least one hand pose features record(s) and/or hand motion features record(s) is identified based on the group of discrete pose values and/or motion values.

A code section is constructed from the selected code segment(s) and the identified values, and is automatically added to the code edited by the programmer in the IDE. The code section may include one or more logical sequences associated with the one or more hand gestures, each may be represented, for example by a unique FSM. The code section may use one or more gesture libraries to construct one or more hand poses and/or hand motions constituting the logical sequence of each hand gesture. The code section may be incorporated into one or more applications to make use of the hand gestures for interacting with one or more users, for example, as HMI. Optionally the code section follows a gesture API which may expose a gesture set, for example a gestures library, comprising a plurality of hand gesture though a software interface allowing the programmer to associate one or more application functions to the one or more of the hand gestures.

Some embodiments of the present disclosure may be compared to programming by demonstration (PbD) development techniques, which are used for teaching a computer or robot new behaviors by demonstrating actions on concrete examples. The system records user actions and infers a generalized program that can be used upon new examples. However, in contrast to PbD, a computer is not instructed to perform actions but is instructed to recognize hand gestures.

Before explaining at least one embodiment of the exemplary embodiments in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

Referring now to the drawings, FIG. 1 is a schematic illustration of an exemplary system for injecting a code section to a code edited by a GUI of an IDE, according to some embodiments of the present disclosure. An exemplary system 100 includes an imager 110 for capturing at least one image of hand 150, a client terminal 160 located in proximity to imager 110 and used by a programmer 170, one or more hardware processor(s) 120, a storage medium 130 for storing the code instructions and a dataset 140 with records of hand poses and hand motions and associated code segments. System 100 may be included in on one or more computerized devices, for example, computer, mobile device, computerized machine and/or computerized appliance equipped and/or attached to the imager. Hand 150 may be the hand of programmer 170. Imager 110 may include, for example, color camera(s), depth camera(s), stereo camera(s), infrared (IR) camera(s), a motion detector, a proximity sensor and/or any other imaging device or combination thereof that captures visual signals. Storage medium 130 may include, for example, a digital data storage unit such as a magnetic drive and/or a solid state drive. Storage medium 130 may also be, for example, a content delivery network or content distribution network (CDN) is a large distributed system of servers deployed in multiple data centers across the Internet.

Figure 2:
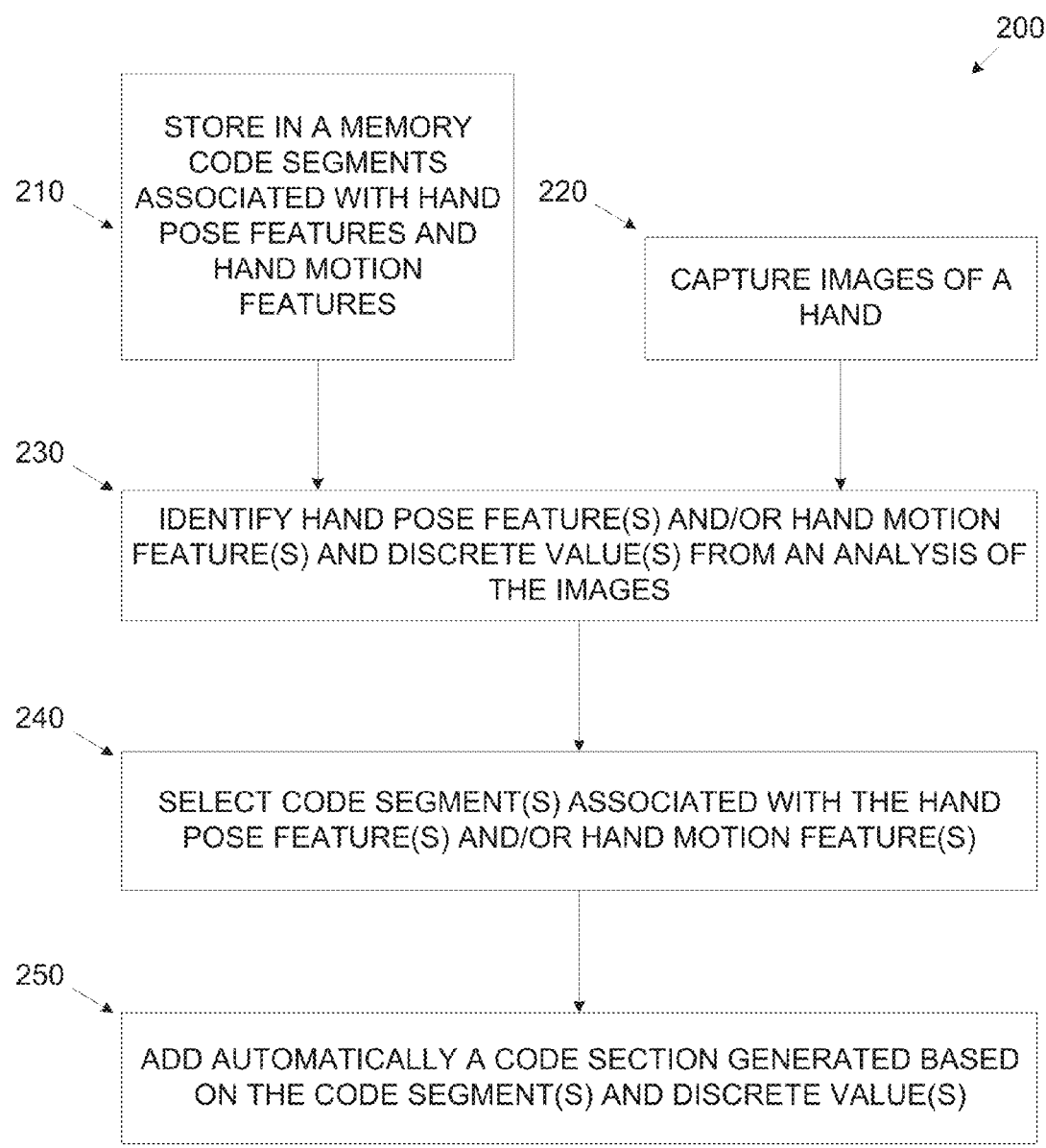
FIG. 2 is a flowchart of an exemplary process for injecting a code section to a code edited by a GUI of an IDE, according to some embodiments of the present disclosure.

Reference is also made to FIG. 2 which illustrates a flowchart of an exemplary process for injecting a code section to a code edited by a GUI of an IDE, according to some embodiments of the present disclosure. An exemplary process 200 is executed in a system such as the exemplary system 100.

As shown at 210, a plurality of code segments, each associated with one of a plurality of hand pose features records and hand motion features records, each is defined by a unique set of discrete values, are stored in dataset 140.

The code segments may include code in any programming language, optionally corresponding to the programming language used in the IDE, for example, C++, JavaScript, Extensible Markup Language (XML), Extensible Application Markup Language (XAML), objective-c and/or any other language and/or data structure representation. The code segments may include code to instruct a computer to identify hand gestures and execute commands based on the gestures. Optionally, the code may include gesture properties, such as timing and/or size.

Figure 3:
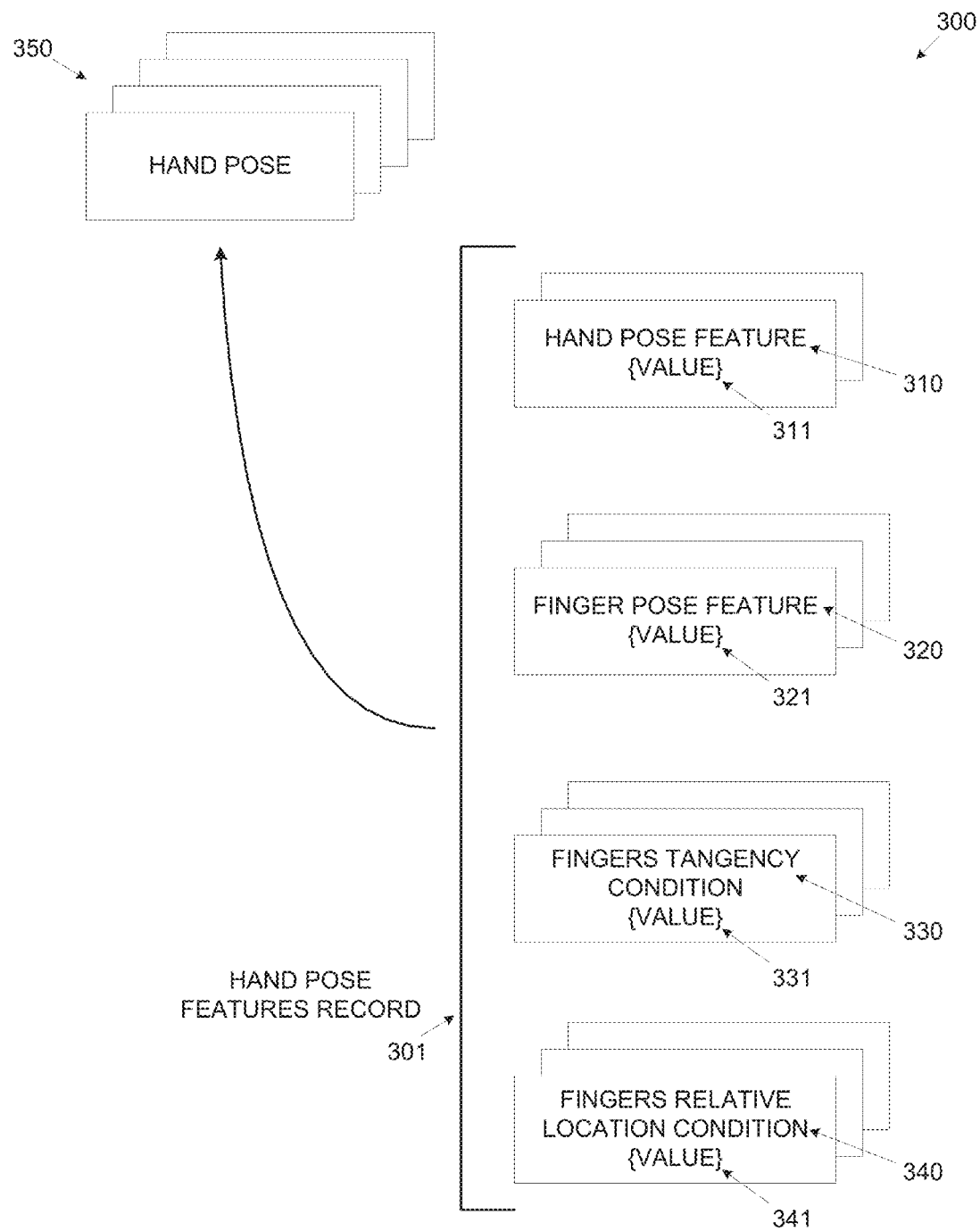
FIG. 3 is a schematic illustration of exemplary hand poses construction, according to some embodiments of the present disclosure.

Reference is now made to FIG. 3, which is a schematic illustration of exemplary hand poses construction, according to some embodiments of the present disclosure. Illustration 300 depicts exemplary hand poses construction 350 as a hand pose features record 301 which includes one or more pose features 310, 320, 330 and 340. Each of the pose features may be assigned with one or more discrete pose value 311, 321, 331 and/or 341 which identify the state (value) of the respective pose feature 310, 320, 330 and/or 340 for an associated hand pose of the hand poses 350. The combination of the one or more discrete pose values 311, 321, 331 and/or 341 of the respective pose features 310, 320, 330 and 340 as defined by the hand pose features record 301 defines a specific pose of the hand poses 350. The hand pose features record 301 may be represented as, for example, a features vector, a features matrix and/or a features table stored in storage medium 130. The hand pose features record 301 may include values of one or more of the following pose features:

Palm pose features—one or more palm pose features 310 include, for example, hand selection, palm direction, palm rotation and/or hand location. Hand selection may identify which hand is active and may include discrete pose values 311 such as, for example, right, left, both and/or any. Palm direction may define the direction in which the active palm of the hand is facing and may include discrete pose values 311 such as, for example, left, right, up, down, forward and/or backward. Palm rotation may define the rotation state of the palm of the active hand and may include discrete pose values 311 such as, for example, left, right, up, down, forward and/or backward. Hand location may identify the spatial location of the active hand in space and may include discrete pose values 311 such as, center of field of view (FOV), right side of FOV, left side of FOV, top of FOV, bottom of FOV, front of FOV and/or rear of FOV. Where FOV is for example, the visible space of an imager 110. Optionally, hand location is identified with respect to a fixed object present in the FOV, for example, keyboard and/or pointing device so that hand location may be defined by discrete pose values 311 such as, for example, above_keyboard, behind_keyboard, right_of_keyboard and/or left_of_keyboard.

Finger flexion features—one or more finger flexion features 320 which are defined per finger. For example, a finger flexion feature 320 may be a flexion and/or curve state which may include discrete pose values 321 such as, for example stretched, folded and/or open represented, for example by 0, 1, and 2. Each finger (thumb, index, middle, ring and/or pinky) is assigned one or more specific finger features, for example, {thumb, middle, ring, pinky} in {folded} state and {index} in {stretched} state.

Finger tangency condition features—one or more fingers tangency features 130 which are defined per finger. The tangency feature may define a touch condition of any two or more fingers and/or touch type and may include discrete pose values 331 such as, for example, not touching, fingertip and/or full touch.

Finger relative location condition features—one or more fingers relative location features 340 are defined per finger. Each of the finger relative location condition features 340 may define a relative location of one finger in relation to another. The fingers relative location features 340 may include discrete pose values 341 such as, for example, one or more fingers are located relatively to another one or more fingers to the left, right, above, below, inward, outward, in front and/or behind.

Each one of the hand poses 350 is defined by a unique one of the hand pose features records 301 which may be a combination and/or sequence of one or more discrete pose values 311, 321, 331 and/or 341 each providing a value of the corresponding hand pose feature 310, 320, 330 and/or 340. The hand pose features records 101 may include only some (and not all) of the discrete pose values 311, 321, 331 and/or 341 while other discrete pose values 311, 321, 331 and/or 341 which are not included are left free. For example, the hand pose features records 301 may define a specific state of the fingers (for example discrete pose values 321, 331 and/or 341) while the direction of the hand is left unspecified (for example discrete pose value 311). In this case the hand pose 350 is identified, recognized and/or classified in runtime at the detection of the fingers state as defined by the hand pose features records 301 with the hand facing any direction. Using the discrete pose values 311, 321, 331 and/or 341 allows for simple creation of a hand pose 350 as there are a finite number of discrete pose values 311, 321, 331 and/or 341 with which the hand pose 350 may be created. For instance, the palm rotation feature included in the hand pose feature 310 may include up to six discrete pose values 311—left, right, up, down, forward and backward. The discrete representation of the hand pose features 310, 320, 330 and/or 340 may not be limited to discrete values only. Continuous values of the one or more hand features 310, 320, 330 and/or 340 may be represented by discrete pose values 311, 321, 331 and/or 341 respectively by quantizing the continuous values. For example, the palm rotation palm pose feature may be defined with 8 discrete pose values 311—0°, 45°, 90°, 135°, 180°, 225°, 270° and 315° to quantize the complete rotation range of 0°-360°.

Figure 4:
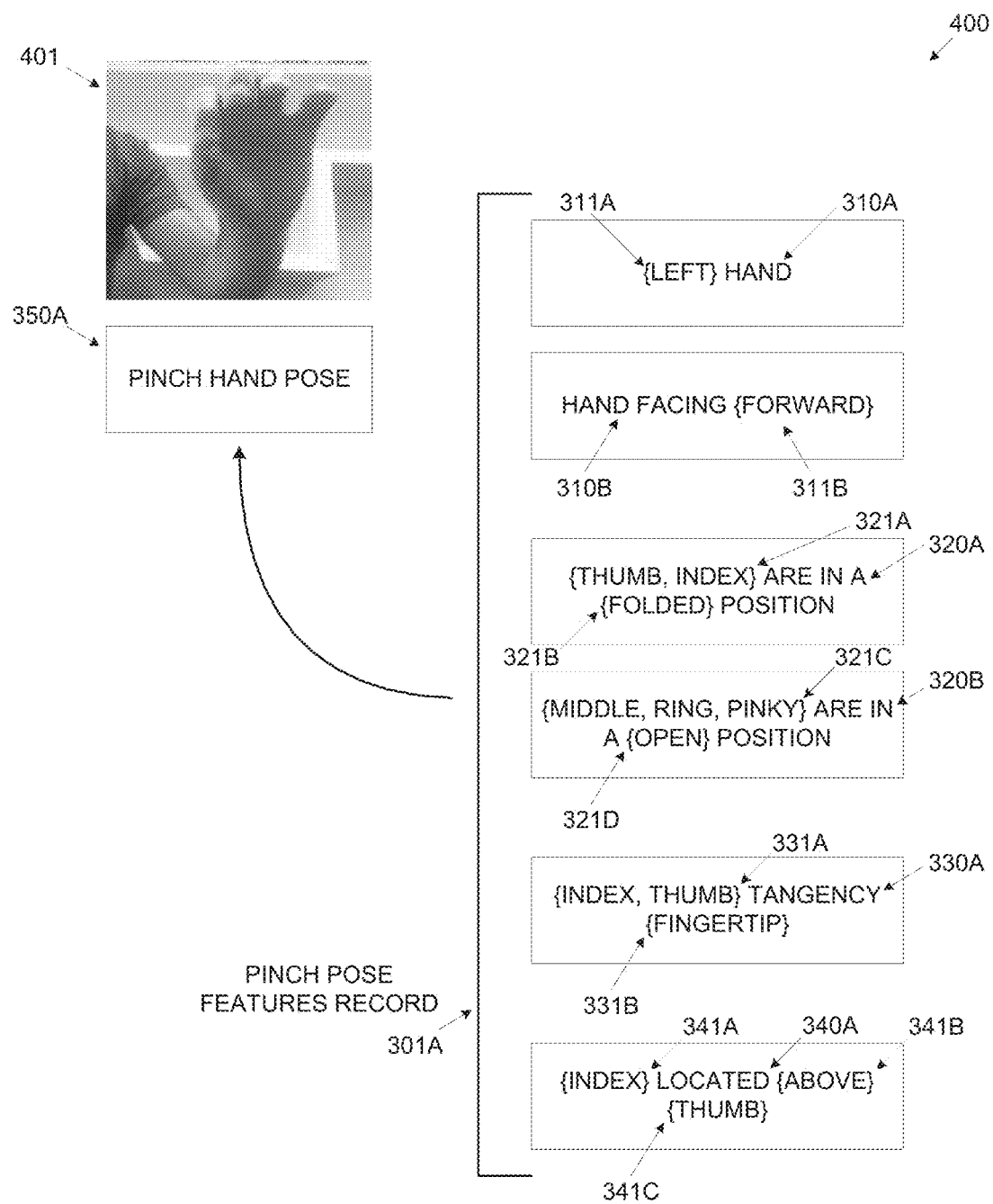
FIG. 4 is a schematic illustration of an exemplary pinch basic hand pose construction, according to some embodiments of the present disclosure.

Reference is now made to FIG. 4 which is a schematic illustration of an exemplary pinch basic hand pose construction, according to some embodiments of the present disclosure. Illustration 400 depicts an exemplary pinch hand pose 350A construction by a pinch pose features record 301A comprising discrete pose values such as the discrete pose values 311, 321, 331 and/or 341, each indicating a value of a corresponding hand pose feature such as the pose features 310, 320, 330 and/or 340. The pinch hand pose 350A which is visualized through an image capture 401 is created with some of the plurality of discrete pose values 311, 321, 331 and 341 as follows:

A hand selection feature 310A is assigned a discrete pose value 311A to indicate the left hand is active.

A palm direction feature 310B is assigned a discrete pose value 311B to indicate the palm of the active hand is facing forward.

A fingers flexion feature 320A is assigned a discrete pose value 321A and a discrete flexion value 321B to indicate the thumb and index fingers are folded.

A fingers flexion feature 320B is assigned a discrete pose value 321C and a discrete pose value 321D to indicate the middle, ring and pinky fingers are open.

A fingers tangency condition feature 330A is assigned a discrete pose value 331A to indicate the thumb and index fingers are touching at their tips.

A fingers relative location feature 340A is assigned a discrete pose value 341A, a discrete pose value 341B and a discrete pose value 341C to indicate the index finger is located above the thumb finger.

As seen above, the pinch hand pose 350A is uniquely defined by a pinch pose features record 301A comprising the discrete pose values 311A, 311B, 321A, 321B, 321C, 321D, 331A, 331B, 341A, 341B and 341C corresponding to the pose features 310A, 310B, 320A, 320B, 330A and 340A respectively. Similarly additional hand poses may be created using the API and associated with the one or more application functions as indicated by the programmer.

Figure 5:
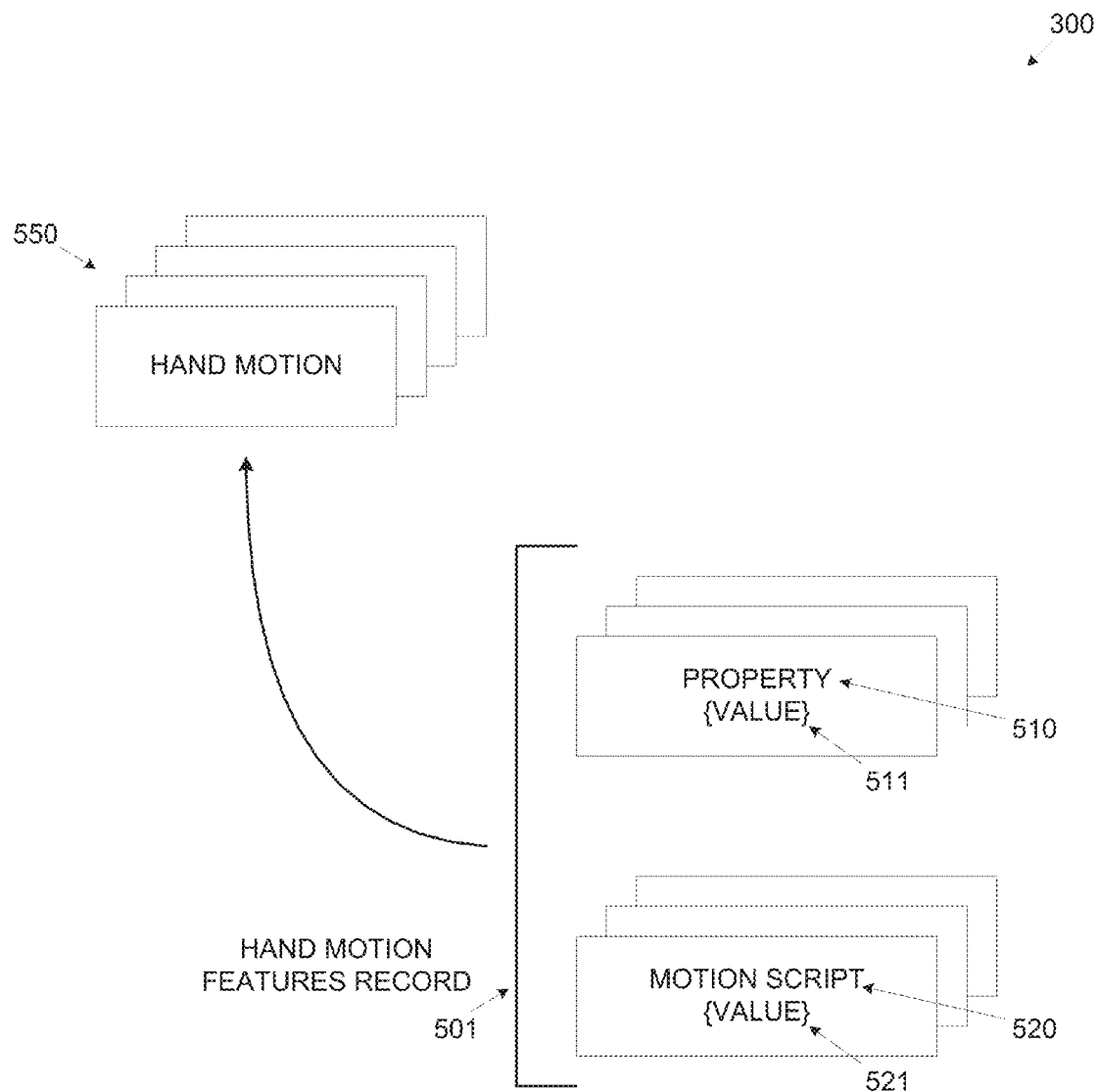
FIG. 5 is a schematic illustration of an exemplary basic hand motions construction, according to some embodiments of the present disclosure.

Reference is now made to FIG. 5, which is a schematic illustration of an exemplary basic hand motions construction, according to some embodiments of the present disclosure. Illustration 500 depicts exemplary hand motions 550 construction as a hand motion features record 501 which includes one or more hand motion features 510 and 520. Each of the hand motion features 510 and 520 may be assigned with one or more discrete motion values 511 and/or 521 which identify the state (value) of the respective hand motion feature 510 and/or 520 for an associated hand motion of the hand motions 550. The hand motion features record 501 identifies a specific motion of a hand and/or finger(s) which may later be identified, recognized and/or classified by monitoring the movement of the user's hands. Continuous values of the one or more hand motion features 510 and/or 520 may be represented by the discrete motion values 511 and/or 521 by quantizing the continuous values. The hand motion features record 501 may be represented as, for example, a features vector, a features matrix and/or a features table. The hand motion features record 501 may include one or more of the following hand motion features:

Motion property features—one or more motion property features 510 may include, for example, motion size, motion speed and/or motion location. Motion size may identify the size (scope) of the motion, and may include discrete motion values 511 such as, for example, small, normal and/or large. Motion speed may define the speed of the motion and may include discrete motion values 511 such as, for example, slow, normal, fast and/or abrupt. Motion location may identify the spatial location in which the motion is performed, and may include discrete motion values 511 such as, for example, center of FOV, right side of FOV, left side of FOV, top of FOV, bottom of FOV, front of FOV and/or rear of FOV. Optionally, hand location is identified with respect to a fixed object present in the FOV, for example, keyboard and/or pointing device so that hand location may include discrete motion values 511 such as, for example, above_keyboard, behind_keyboard, right_of_keyboard and/or left_of_keyboard.

Motion script features—one or more motion script features 520 may define the actual motion performed. The motion script values 520 may include, for example, motion direction, motion start point, motion end point and/or pre-defined curve shapes.

The motion direction feature 520 may include discreet motion values 521 such as, for example, upward, downward, left_to_right, right_to_left, diagonal_left_upward, diagonal_right_upward, diagonal_left_downward, diagonal_right_downward, clockwise_arc_right_upward, clockwise_arc_right_downward, clockwise_arc_left_upward, clockwise_arc_left_downward, counter_clockwise_arc_right_upward, counter_clockwise_arc_right_downward, counter_clockwise_arc_left_upward and/or counter_clockwise_arc_left_downward. The motion curve shapes may include for example, at-sign (@), infinity sign (∞), digit signs, alphabet signs and the likes. Optionally, additional one or more curve shapes may be created as pre-defined curves, for example, checkmark, bill request and the likes as it is desirable to assign application functions a hand gesture which is intuitive and is publically known, for example, at-sign for composing and/or sending an email, checkmark sign for a check operation and/or a scribble for asking for a bill. The one or more curve shapes may optionally be created using a freehand tool in the format of, for example, SVG. Each of the motion script features 320 is defined for a 2D plane, however each of the motion script features 320 may be transposed to depict another 2D plane, for example, X-Y, X-Z and/or Y-Z. Optionally, the motion script features 320 define three dimensional (3D) motions and/or curves using a 3D image data representation format.

Each one of the hand motions 550 is defined by a unique one of the hand motion features records 501 which may a combination and/or sequence of one or more discrete motion values 511 and/or 521 each providing a value of the corresponding hand motion feature 510 and/or 520. Using the discrete motion values 521 and/or 521 allows for simple creation of the hand motions 550 as there are a finite number of discrete motion values 511 and/or 521 with which the hand motion 550 may be created. For instance the motion speed feature included in the hand motion property feature 510 may include up to four discrete motion values 511—slow, normal, fast and abrupt. The discrete representation of the hand motion features 510 and/or 520 may not be limited to discrete values only, continuous values of the one or more hand motion features 510 and/or 520 may be represented by discrete motion values 511 and/or 521 respectively by quantizing the continuous values. For example, the motion speed motion property feature may be defined with 6 discrete motion values 511—5 m/s (meter/second), 10 m/s, 15 m/s, 20 m/s, 25 m/s and 30 m/s to quantize the motion speed of a normal human hand of 0 m/s-30 m/s.

Figure 6:
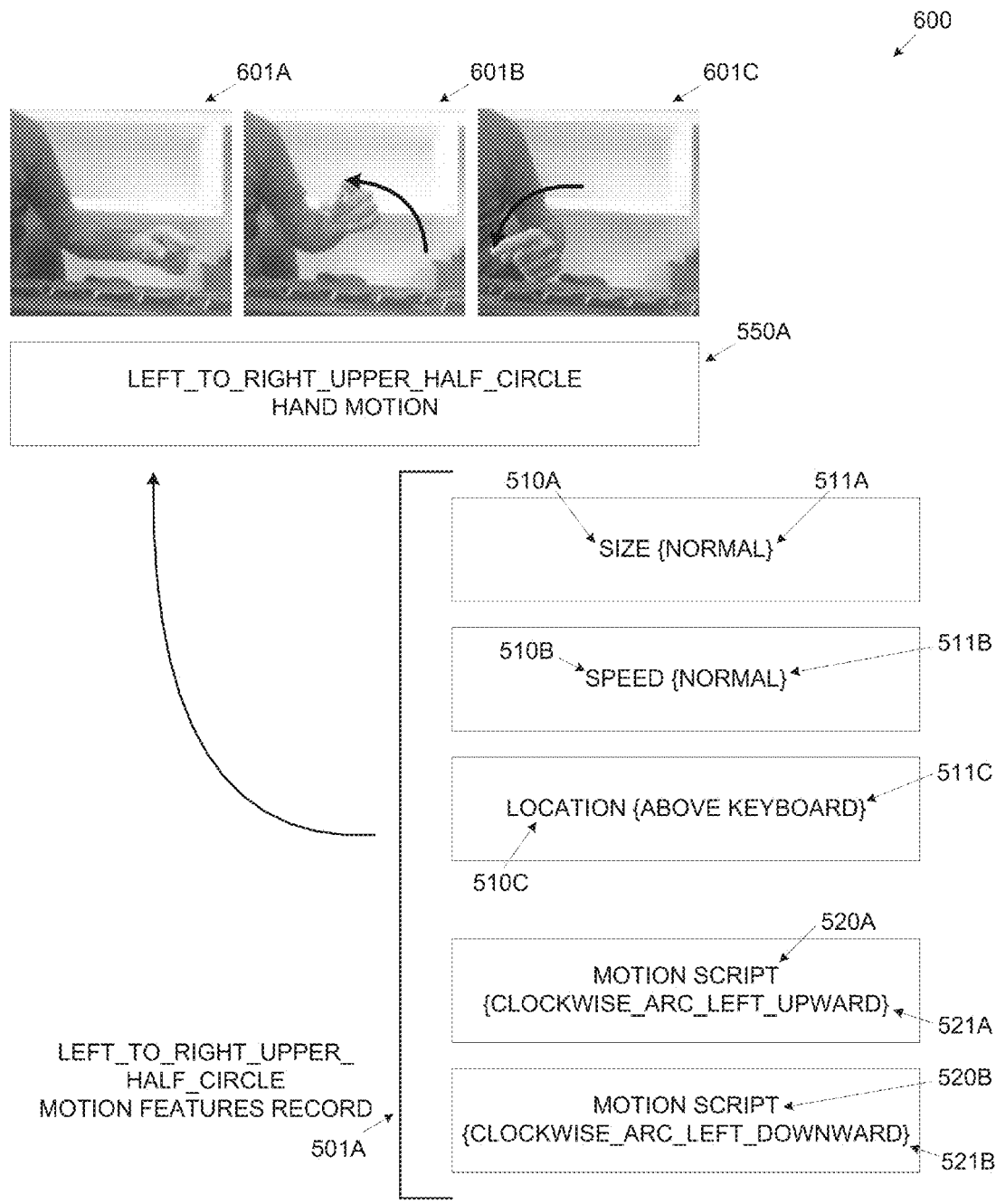
FIG. 6 which is a schematic illustration of an exemplary half circle hand motion construction, according to some embodiments of the present disclosure.

Reference is now made to FIG. 6 which is a schematic illustration of an exemplary half circle hand motion construction, according to some embodiments of the present disclosure. Illustration 600 depicts an exemplary left_to_right_upper_half_circle hand motion 550A construction by a left_to_right_upper_half_circle hand motion features record 501A comprising discrete motion values such as the discrete motion values 511 and/or 521, each indicating a corresponding hand motion feature such as the hand motion features 510 and/or 520. The left_to_right_upper_half_circle hand motion 550A which is visualized through image captures 601A, 601B and 601C is created with some of the plurality of discrete motion values 511 and 521 as follows:
  A motion size feature 510A is assigned a discrete motion value 511A to indicate the motion size is normal.
  A motion speed feature 510B is assigned a discrete motion value 511B to indicate the motion speed is normal.
  A motion location feature 510C is assigned a discrete motion value 511C to indicate the motion is performed above a keyboard.
  A first motion script feature 520A is assigned a discrete motion value 521A to indicate a motion shape of clockwise_arc_left_upward as presented by the image capture 601B.
  A second motion script feature 520B is assigned a discrete motion value 521B to indicate a motion shape of clockwise_arc_left_downward as presented by the image capture 601C.

As seen above, the left_to_right_upper_half_circle motion 550A is uniquely defined by a left_to_right_ upper_half_circle motion features record 501A comprising of the discrete motion values 511A, 511B, 511C, 521A and 521B corresponding to the motion features 510A, 510B, 510C, 520A and 520B respectively. Similarly additional hand and/or finger(s) motion may be created using the API and associated with the one or more application functions as indicated by the programmer.

Figure 7:
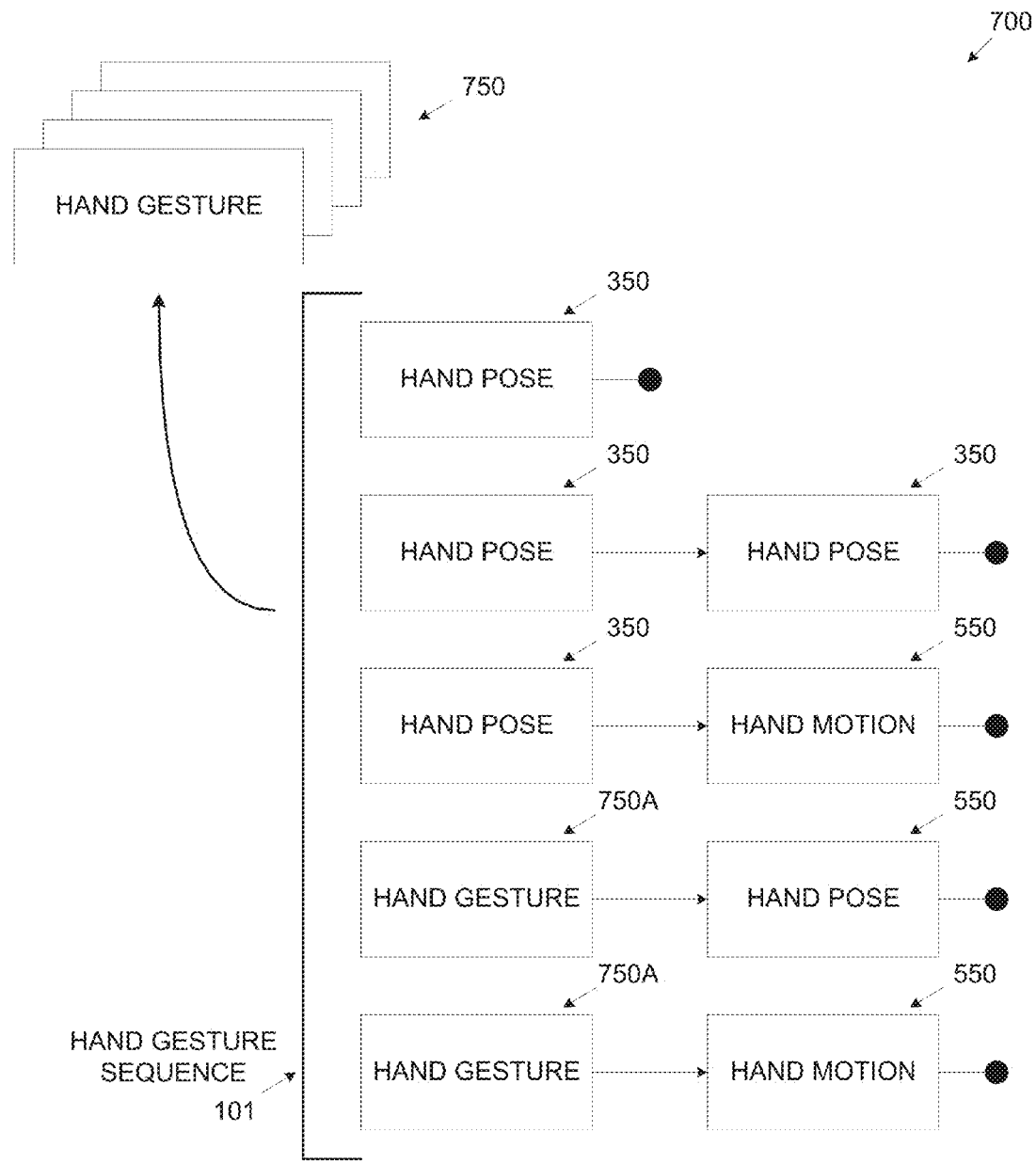
FIG. 7 is a block diagram of the building blocks of exemplary hand gestures, according to some embodiments of the present disclosure.

Reference is now made to FIG. 7 which is a block diagram of the building blocks of an exemplary hand gesture, according to some embodiments of the present disclosure. Illustration 700 depicts several construction schemes of exemplary hand gestures 750. The hand gestures 750 may be created using a gestures visual builder tool through one or more possible constructions, for example:
  (a) The hand gesture 750 may consist of a hand pose, such as one of the hand poses 350.
  (b) The hand gesture 750 may be a combination and/or sequence of two of the hand poses 350.
  (c) The hand gesture 750 may be a combination and/or sequence of one of the hand poses 350 and a hand motion, such as one of the hand motions 550.
  (d) The (first) hand gesture 750 may be a combination and/or sequence of a second hand gesture 750 and one of the hand poses 350. The second hand gesture 750 may be the same one as the first hand gesture 750 or a different one of the hand gestures 750.
  (e) The (first) hand gesture 750 may be a combination and/or sequence of a second hand gesture 750 and one of the hand motions 550. The second hand gesture 750 may be the same one as the first hand gesture 750 or a different one of the hand gestures 750.

The hand gesture 750 may be created through multiple iterations of the constructions (d) and/or (e) above. Each hand gesture 750 is constructed as a unique combination and/or sequence represented by a gesture sequence 701 which comprises of the one or more of: hand poses 350, hand motions 550 and/or hand gestures 750. Each of the hand gestures 750 starts and ends with an idle state 710 which is a virtual state identifying the start and/or the end of the unique hand gesture sequence 701 of the hand gesture 750.

Figure 8:
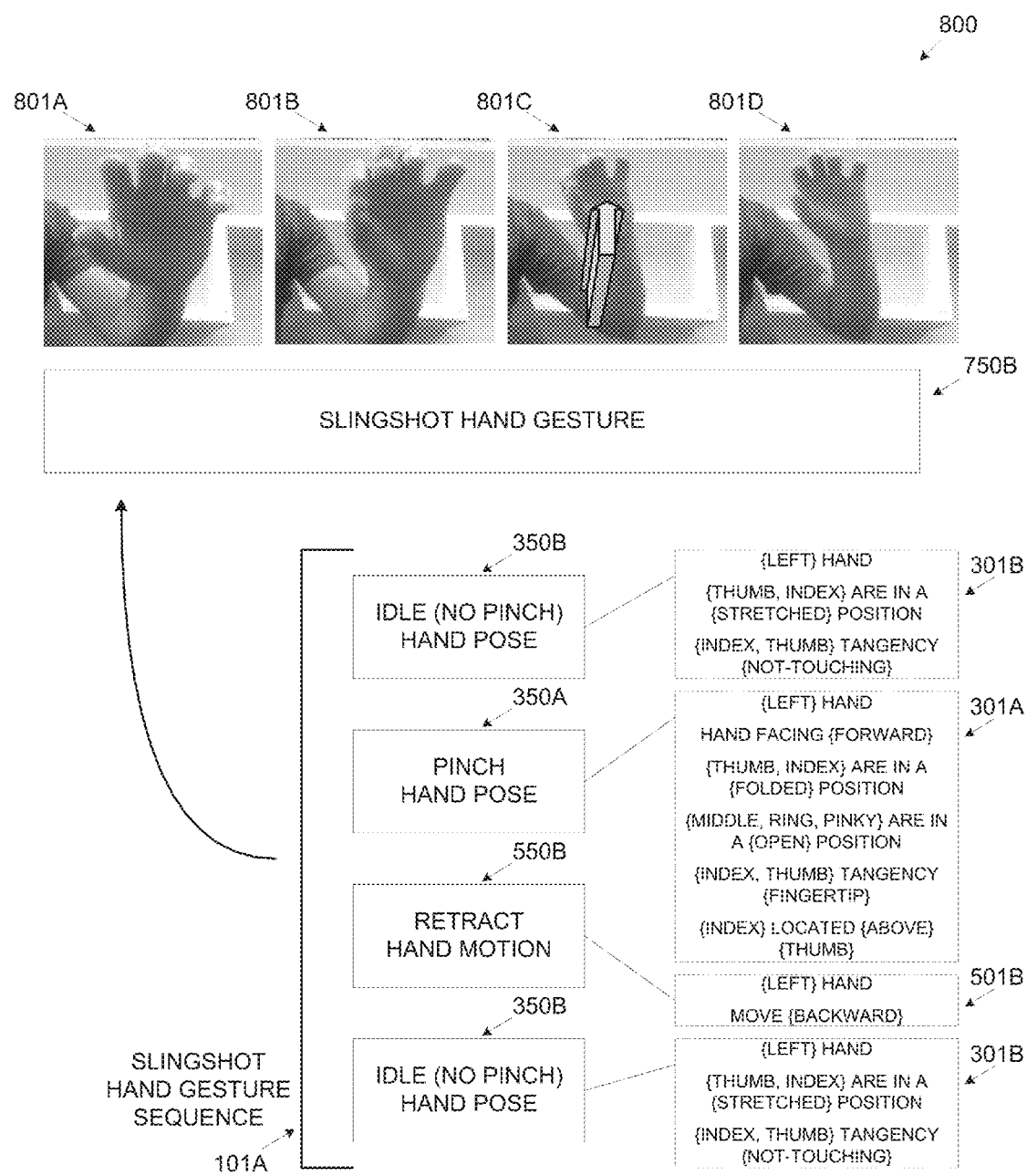
FIG. 8 is a block diagram of the building blocks of an exemplary slingshot hand gesture, according to some embodiments of the present disclosure.

Reference is now made to FIG. 8 which is a block diagram of the building blocks of an exemplary slingshot hand gesture, according to some embodiments of the present disclosure. Illustration 800 depicts an exemplary slingshot hand gesture 750A construction from multiple hand poses such as the hand poses 350 and hand motions such as the hand motions 550. The slingshot hand gesture 750A which is visualized through image captures 801A, 801B, 801C and 801D is constructed of a combination and/or sequence of an idle state such as the virtual idle state 710, a no pinch hand pose 350B, a pinch hand pose such as the pinch hand pose 350A, a retract hand motion 550B and another idle state such as the virtual idle state. The sequence of the slingshot hand gesture 750A is as follows:
  A virtual idle state 710 defines the starting state and/or point of the sequence of the slingshot hand gesture 750A.
  An no pinch hand pose 350B defined by a hand pose features record 301B represents no pinching action as depicted in image capture 801A.
  A pinch hand pose 350A defined by the hand pose features record 301A in which a pinch action is identified as depicted in image capture 801B.
  A retract hand motion 550A defined by a hand motion features record 501B in which the hand is moved backwards as is depicted in image capture 801C.

A no pinch hand pose 350B defined by a hand motion features record 301A in the pinch pose is released and identified as no pinching action as depicted in image capture 801D.

A virtual idle state 710 defines the end state and/or point of the sequence of the slingshot hand gesture 750A.

The sequence of the slingshot hand gesture 750A as described above is represented through a unique slingshot hand gesture sequence 701A which is associated with the slingshot hand gesture. For any of the hand poses 350 and/or hand motions 550 only relevant discrete pose and/or motion values may be defined, as is evident, for example, from the no pinch hand pose features record 301B in which the hand selection discrete pose value 301 (left), the finger flexion discrete pose value 321 (stretched) and the finger tangency discrete pose value 331 (not touching) are defined for the idle pose 350B. Other discrete pose values which are irrelevant to distinguishing between the no pinch hand pose 350B from the pinch hand pose 350A are left free and are not specified. Specifying only the relevant discrete pose and/or motion values allows for several degrees of freedom in the articulation of the hand poses 350 and/or hand motions 550 as performed by different one or more users at runtime. This means each of the one or more users may perform the hand pose 350 and/or hand motion 550 slightly differently and yet they are still recognized, identified and/or classified the same.

The unique combination and/or sequence of each of the hand gestures 750 may be represented by a unique FSM, i.e. the FSM includes one or more of the hand poses 350 and/or the hand motions 550 to represent the hand gesture 750.

Figure 9:
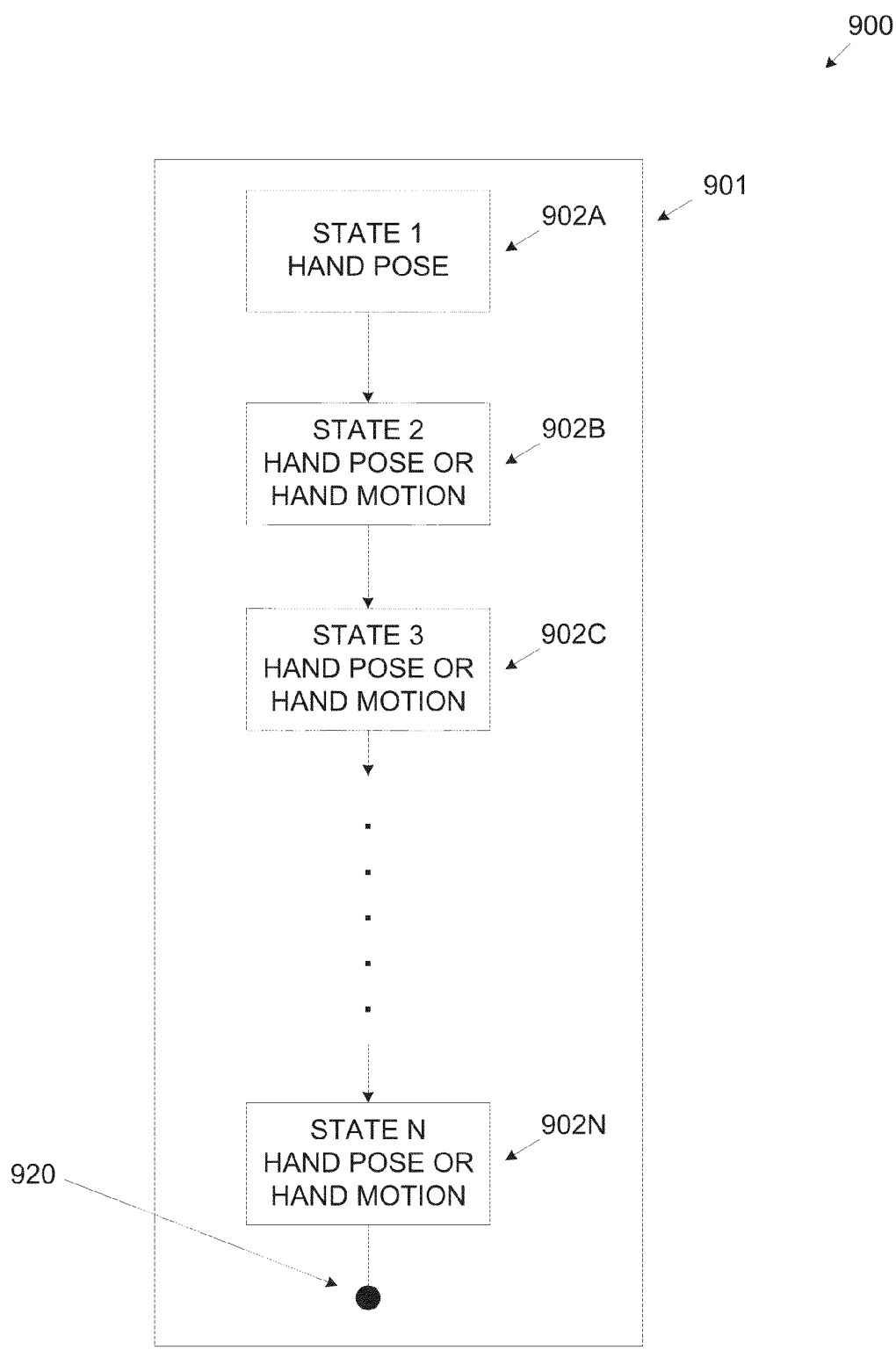
FIG. 9 is a schematic illustration of an exemplary FSM defining hand gestures by a sequence of hand motions and hand poses, according to some embodiments of the present disclosure.

Reference is now made to FIG. 9 which is a schematic illustration of a finite state machine (FSM) defining hand gestures by a sequence of hand motions and hand poses, according to some embodiments of the present disclosure. An illustration 900 depicts an FSM 901 which may represent a hand gesture sequence such as the hand gesture sequence 101. The FSM 901 may include one or more states 902A, 902B, 902C through 902N. The first state 902A is a hand pose which is a start of a sequence representing a hand gesture such as the hand gesture 750. Each of the succeeding states 902B, 902C through 902N may be either a hand pose such as the hand poses 350 or a hand motion such as the hand motions 550. The FSM 901 is ended with an FSM end point 920.

Reference is again made to FIG. 1 and FIG. 2. As shown at 220, a plurality of images of a hand 150 is captured by imager 110, while an IDE is executed on client terminal 160. The plurality of images may be a sequence of images, such as a video. The GUI of the IDE may include an interface element, such as a button, for activating imager 110.

Then, as shown at 230, the images are analyzed by processor(s) 120 and one or more hand pose and hand motion features, and their discrete pose and motion values, are identified. The analysis may include, for example, discriminative fern ensemble (DFE), discriminative tree ensemble (DTE) and/or any other image processing algorithm and/or method.

Recognition, identification and/or classification of the one or more hand poses 350 and/or one or more hand motions 550 is simpler than other image recognition processes of hand poses and/or motions, since the discrete pose values 311, 321, 331 and/or 341 and/or the discrete motion values 511 and/or 521 are easily identified because there is no need for hand skeleton modeling during recognition, identification and/or classification, thus reducing the level of computer vision processing. Furthermore use of computer learning and/or three dimensional vector processing is completely avoided by programmer 170 as the one or more hand poses 350 and/or one or more hand motions 550 are identified, recognized and/or classified using a gesture library and/or a gesture API which may be trained in advance. Training of the gesture library and/or gesture API may be greatly simplified thus reducing the processing load, due to the discrete construction of the hand poses 350 and/or hand motions 550 which allows for a finite, limited number of possible states for each of the pose features 310, 320, 330 and/or 340 and/or each of the motion features 510 and 520.

Optionally, one or more hand pose features records and hand motion features records are identified. The hand pose features records and hand motion features records may be identified by first identifying a group of discrete pose values and/or a group of discrete motion values from the images. This may be done, for example, by using matching algorithm(s) between the identified values and the values stored in dataset 140 for each features record.

Then, as shown at 240, one or more code segments are selected by processor(s) 120 from the plurality of code segments stored in dataset 140, according to the hand pose features and hand motion features identified by the analysis from the images. For example, when exemplary slingshot hand gesture 750B is captured, code segments associated with each of the features of not pinch hand pose 350B, pinch hand pose 350A and retract hand motion 550B are selected.

Finally, as shown at 250, a code section is generated based on the selected code segments and the discrete values of the hand pose and motion features, and is automatically added to a code presented by a code editor GUI of the IDE. The code is constructed by adding the identified discrete value to each of the code segments associated with a hand pose or motion feature. Reference is now made to FIG. 10, which is an exemplary code section for slingshot hand gesture 750A, according to some embodiments of the present disclosure. For example, the code segment "FingerFlexion" is associated with finger flexion feature 320, with the identified value "Opened", which is constructed into "FingerFlexion.Opened".

The code section may conform to a gesture API to support a common well established programming interface for creating, utilizing and/or distributing the hand gestures 750 to other one or more applications. A gestures library may be created which may be used by programmer 170 to integrate with other one or more applications. Optionally, dynamic linking of the gestures library us supported through a dynamic link library (DLL) that is loaded to the target computerized device to be linked with the other one or more applications in runtime. Optionally, the code section includes data structure references to the dataset of hand pose and motion features and the discrete values, for example using XML or XAML.

Figure 11:
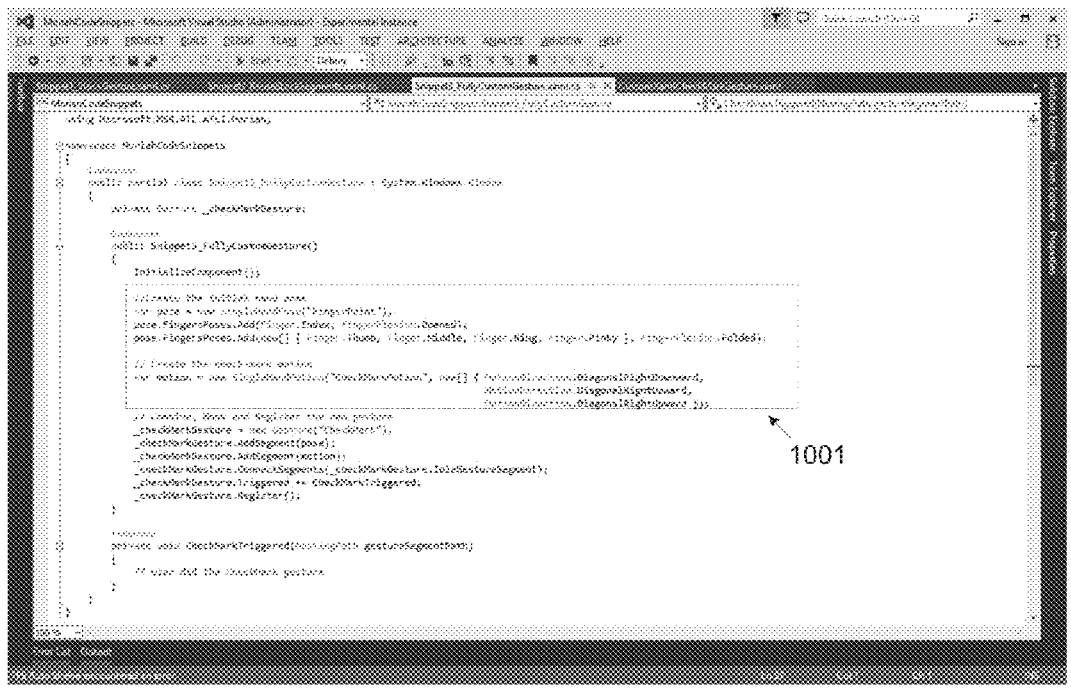
FIG. 11 is a schematic illustration presenting screen snapshots of an exemplary a GUI of an IDE that include an added code section for checkmark gesture, according to some embodiments of the present disclosure.

Reference is now made to FIG. 11, which is a schematic illustration presenting screen snapshots of an exemplary a GUI of an IDE that include an added code section 1001 for checkmark gesture, according to some embodiments of the present disclosure. Reference is made to FIG. 12, which is an exemplary XAML code section for the checkmark gesture of FIG. 11, according to some embodiments of the present disclosure.

It is expected that during the life of a patent maturing from this application many relevant IDE systems will be developed and the scope of the term IDE is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

According to an aspect of some embodiments of the present invention there is provided a system of injecting a code section to a code edited by a graphical user interface (GUI) of an integrated development environment (IDE), comprising: a memory storing a dataset associating each of a plurality of code segments with one of a plurality of hand pose features and a plurality of hand motion features; an imager adapted to capture a plurality of images of a hand while an IDE being executed on a client terminal located in proximity to the imager; a code store storing a code of an application; and at least one processor coupled to the imager, the memory and the program store for executing the stored code, the code comprising: code instructions to identify at least one of the plurality of hand pose features and the plurality of hand motion features and at least one discrete value of the identified at least one hand pose features and hand motion features from an analysis of the plurality of images; code instructions to select at least one of the plurality of code segments associated with the identified at least one hand pose features and hand motion features; and code instructions to add automatically a code section generated based on the at least one code segments and the at least one discrete value to a code presented by a code editor of the IDE.

Optionally, the hand pose feature is a member selected from a group comprising of: active hand, hand pose, pose of at least one finger, relative location between at least two fingers and tangency between at least two fingers.

Optionally, the hand motion feature is a member selected from a group comprising of: motion properties and motion script, the motion script defines at least one of: hand motion and motion of at least one finger.

Optionally, the code section conforms to a gesture application user interface (API).

Optionally, each the unique set of discrete pose values and discrete motion values being defined by a unique finite state machine model.

Optionally, each of the plurality of code segments includes data structure references to the dataset.

According to an aspect of some embodiments of the present invention there is provided a method for injecting a code section to a code edited by a graphical user interface (GUI) of an integrated development environment (IDE), comprising: storing in a memory a dataset associating each of a plurality of code segments with one of a plurality of hand pose features and a plurality of hand motion features; capturing by an imager a plurality of images of a hand while an IDE being executed on a client terminal located in proximity to the imager; identifying a at least one of the plurality of hand pose features and the plurality of hand motion features and at least one discrete value of the identified at least one hand pose features and hand motion features from an analysis of the plurality of images; selecting at least one of the plurality of code segments associated with the identified at least one hand pose features and hand motion features; and adding automatically a code section generated based on the at least one code segments and the at least one discrete value to a code presented by a code editor of the IDE.

Optionally, the hand pose feature is a member selected from a group comprising of: active hand, hand pose, pose of at least one finger, relative location between at least two fingers and tangency between at least two fingers.

Optionally, the hand motion feature is a member selected from a group comprising of: motion properties and motion script, the motion script defines at least one of: hand motion and motion of at least one finger.

Optionally, the code section conforms to a gesture application user interface (API).

Optionally, each the unique set of discrete pose values and discrete motion values being defined by a unique finite state machine model.

Optionally, each of the plurality of code segments includes data structure references to the dataset.

According to an aspect of some embodiments of the present invention there is provided a software program product for injecting a code section to a code edited by a graphical user interface (GUI) of an integrated development environment (IDE), comprising: a non-transitory computer readable storage medium; first program instructions for receiving a plurality of images of a hand captured by an imager while an IDE being executed on a client terminal located in proximity to the imager; second program instructions for accessing a memory storing a dataset associating each of a plurality of code segments with one of a plurality of hand pose features and a plurality of hand motion features; third program instructions for identifying a at least one of the plurality of hand pose features and the plurality of hand motion features and at least one discrete value of the identified at least one hand pose features and hand motion features from an analysis of the plurality of images; fourth program instructions for selecting at least one of the plurality of code segments associated with the identified at least one hand pose features and hand motion features; and fifth program instructions for adding automatically a code section generated based on the at least one code segments and the at least one discrete value to a code presented by a code editor of the IDE; wherein the first, second, third, fourth, and fifth program instructions are executed by at least one computerized processor from the non-transitory computer readable storage medium.

Optionally, the hand pose feature is a member selected from a group comprising of: active hand, hand pose, pose of at least one finger, relative location between at least two fingers and tangency between at least two fingers.

Optionally, the hand motion feature is a member selected from a group comprising of: motion properties and motion script, the motion script defines at least one of: hand motion and motion of at least one finger.

Optionally, the code section conforms to a gesture application user interface (API).

Optionally, each the unique set of discrete pose values and discrete motion values being defined by a unique finite state machine model.

Optionally, each of the plurality of code segments includes data structure references to the dataset.

According to an aspect of some embodiments of the present invention there is provided a system of injecting a code section to a code edited by a graphical user interface (GUI) of an integrated development environment (IDE), comprising: a memory storing a dataset associating each of a plurality of code segments with one of a plurality of hand pose features records and a plurality of hand motion features records, each one of the plurality of hand pose features records being defined by a unique set of discrete pose values and each one of the plurality of hand motion features records being defined by a unique set of discrete motion values; an imager adapted to capture a plurality of images of a hand while an IDE being executed on a client terminal located in proximity to the imager; a code store storing a code of an application; and at least one processor coupled to the imager, the memory and the program store for executing the stored code, the code comprising: code instructions to identify at least one of the plurality of hand pose features records and the plurality of hand motion features records from an analysis of the plurality of images; code instructions to select at least one of the plurality of code segments associated with the identified at least one hand pose features records and hand motion features records; and code instructions to add automatically a code section generated based on the at least one code segments to a code presented by a code editor of the IDE.

According to an aspect of some embodiments of the present invention there is provided a method of injecting a code section to a code edited by a graphical user interface (GUI) of an integrated development environment (IDE), comprising: storing in a memory a dataset associating each of a plurality of code segments with one of a plurality of hand pose features records and a plurality of hand motion features records, each one of the plurality of hand pose features records being defined by a unique set of discrete pose values and each one of the plurality of hand motion features records being defined by a unique set of discrete motion values; capturing by an imager a plurality of images of a hand while an IDE being executed on a client terminal located in proximity to the imager; identifying at least one of the plurality of hand pose features records and the plurality of hand motion features records from an analysis of the plurality of images; selecting at least one of the plurality of code segments associated with the identified at least one hand pose features records and hand motion features records; and adding automatically a code section generated based on the at least one code segments to a code presented by a code editor of the IDE.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A system of injecting a code section to a code edited by a graphical user interface (GUI) of an integrated development environment (IDE), comprising:
    a memory storing a dataset associating each of a plurality of code segments with one of a plurality of hand pose features and a plurality of hand motion features;
    an imager adapted to capture a plurality of images of a hand while an IDE being executed on a client terminal located in proximity to said imager;
    a code store storing a code of an application; and
    at least one processor coupled to the imager, the memory and the program store for executing the stored code for constructing a code section for identifying a gesture sequence comprising multiple hand poses and at least one hand motion, the stored code comprising:
    code instructions to identify each one of said multiple hand poses by detecting at least one of said plurality of hand pose features by an analysis of said plurality of images;
    code instructions to identify at least one of said plurality of hand motion features by detecting at least one of said plurality of hand motion features by said analysis;
    code instructions to construct said code section from multiple code segments which are selected from said plurality of code segments according to said identified at least one hand pose feature and said at least one identified hand motion feature; and
    code instructions to add automatically said code section to a code presented by a code editor of said IDE.

2. The system of claim 1, wherein said hand pose feature is a member selected from a group comprising of: active hand, hand pose, pose of at least one finger, relative location between at least two fingers and tangency between at least two fingers.

3. The system of claim 1, wherein said hand motion feature is a member selected from a group comprising of: motion properties and motion script, said motion script defines at least one of: hand motion and motion of at least one finger.

4. The system of claim 1, wherein said code section conforms to a gesture application user interface (API).

5. The system of claim 1, wherein said code section comprises discrete motion values defined by a unique finite state machine model.

6. The system of claim 1, wherein each of said plurality of code segments includes data structure references to said dataset.

7. A method for injecting a code section to a code edited by a graphical user interface (GUI) of an integrated development environment (IDE), comprising:
    storing in a memory a dataset associating each of a plurality of code segments with one of a plurality of hand pose features and a plurality of hand motion features;
    capturing by an imager a plurality of images of a hand while an IDE being executed on a client terminal located in proximity to said imager;
    constructing a code section for identifying a gesture sequence comprising multiple hand poses and at least one hand motion by:
    identifying each one of said multiple hand poses by detecting at least one of said plurality of hand pose features by an analysis of said plurality of images;
    identifying at least one of said plurality of hand motion features by detecting at least one of said plurality of hand motion features by said analysis;

constructing said code section from multiple code segments which are selected from at least one of said plurality of code segments associated with said identified at least one hand pose feature and said at least one identified hand motion feature; and adding automatically said code section to a code presented by a code editor of said IDE.

8. The method of claim 7, wherein said hand pose feature is a member selected from a group comprising of: active hand, hand pose, pose of at least one finger, relative location between at least two fingers and tangency between at least two fingers.

9. The method of claim 7, wherein said hand motion feature is a member selected from a group comprising of: motion properties and motion script, said motion script defines at least one of: hand motion and motion of at least one finger.

10. The method of claim 7, wherein said code section conforms to a gesture application user interface (API).

11. The method of claim 7, wherein said code section comprises discrete motion values defined by a unique finite state machine model.

12. The method of claim 7, wherein each of said plurality of code segments includes data structure references to said dataset.

13. A software program product for injecting a code section to a code edited by a graphical user interface (GUI) of an integrated development environment (IDE), comprising:
 a non-transitory computer readable storage medium;
 first program instructions for receiving a plurality of images of a hand captured by an imager while an IDE being executed on a client terminal located in proximity to said imager;
 second program instructions for accessing a memory storing a dataset associating each of a plurality of code segments with one of a plurality of hand pose features and a plurality of hand motion features;
 third program instructions for constructing a code section for identifying a gesture sequence comprising multiple hand poses and at least one hand motion by:
  identifying each one of said multiple hand poses by detecting at least one of said plurality of hand pose features and said plurality of hand motion features by an analysis of said plurality of images and at least one of said plurality of hand motion features by detecting at least one of said plurality of hand motion features by said analysis;
 construct said code section from multiple code segments which are selected from said plurality of code segments according to said at least one identified hand pose feature and at least one hand motion feature; and
 fourth program instructions for adding automatically said code section to a code presented by a code editor of said IDE;
 wherein said first, second, third, and fourth program instructions are executed by at least one computerized processor from said non-transitory computer readable storage medium.

14. The software program product of claim 13, wherein said hand pose feature is a member selected from a group comprising of: active hand, hand pose, pose of at least one finger, relative location between at least two fingers and tangency between at least two fingers.

15. The software program product of claim 13, wherein said hand motion feature is a member selected from a group comprising of: motion properties and motion script, said motion script defines at least one of: hand motion and motion of at least one finger.

16. The software program product of claim 13, wherein said code section conforms to a gesture application user interface (API).

17. The software program product of claim 13, wherein said code section comprises discrete motion values defined by a unique finite state machine model.

18. The software program product of claim 13, wherein each of said plurality of code segments includes data structure references to said dataset.

19. A system of injecting a code section to a code edited by a graphical user interface (GUI) of an integrated development environment (IDE), comprising:
 a memory storing a dataset associating each of a plurality of code segments with one of a plurality of hand pose features and a plurality of hand motion features, each one of said plurality of hand pose features being defined by a unique set of discrete pose values and each one of said plurality of hand motion features being defined by a unique set of discrete motion values;
 an imager adapted to capture a plurality of images of a hand while an IDE being executed on a client terminal located in proximity to said imager;
 a code store storing a code of an application for constructing a code section for identifying a gesture sequence comprising multiple hand poses and at least one hand motion; and
 at least one processor coupled to the imager, the memory and the program store for executing the stored code, the stored code comprising:
 code instructions to identify each one of said multiple hand poses by detecting at least one of said plurality of hand pose features by an analysis of said plurality of images;
 code instructions to identify at least one of said plurality of hand motion features by detecting at least one of said plurality of hand motion features by said analysis;
 code instructions to construct said code section from multiple code segments which are selected from said plurality of code segments according to said identified at least one hand pose feature and said at least one identified hand motion feature; and
 code instructions to add automatically said code section to a code presented by a code editor of said IDE.

20. A method of injecting a code section to a code edited by a graphical user interface (GUI) of an integrated development environment (IDE), comprising:
 storing in a memory a dataset associating each of a plurality of code segments with one of a plurality of hand pose features records and a plurality of hand motion features records, each one of said plurality of hand pose features records being defined by a unique set of discrete pose values and each one of said plurality of hand motion features records being defined by a unique set of discrete motion values;
 capturing by an imager a plurality of images of a hand while an IDE being executed on a client terminal located in proximity to said imager;
 constructing a code section for identifying a gesture sequence comprising multiple hand poses and at least one hand motion by:
  identifying each one of said multiple hand poses by detecting at least one of said plurality of hand pose features by an analysis of said plurality of images;

identifying at least one of said plurality of hand motion features by detecting at least one of said plurality of hand motion features by said analysis;

constructing said code section from multiple code segments which are selected from at least one of said plurality of code segments associated with said identified at least one hand pose feature and said at least one identified hand motion feature; and adding automatically said code section to a code presented by a code editor of said IDE.

* * * * *